(12) United States Patent
Corum (10) Patent No.: US 7,808,124 B2
(45) Date of Patent: Oct. 5, 2010

(54) ELECTRIC POWER STORAGE

(75) Inventor: James F. Corum, Morgantown, WV (US)

(73) Assignee: CPG Technologies, LLC, Newbury, OH (US)

(*) Notice: Subject to any disclaimer, the term of this patent is extended or adjusted under 35 U.S.C. 154(b) by 589 days.

(21) Appl. No.: 11/697,014

(22) Filed: Apr. 5, 2007

(65) Prior Publication Data

US 2008/0186646 A1 Aug. 7, 2008

Related U.S. Application Data

(63) Continuation-in-part of application No. 11/670,620, filed on Feb. 2, 2007.

(51) Int. Cl.
*H02J 1/12* (2006.01)
*H02M 3/18* (2006.01)

(52) U.S. Cl. .......................... 307/46; 363/59

(58) Field of Classification Search ............. 307/46, 307/31, 34, 39, 44, 52; 363/74, 59
See application file for complete search history.

(56) References Cited

U.S. PATENT DOCUMENTS

| | | | |
|---|---|---|---|
| 3,012,203 A | 12/1961 | Ping | |
| 3,300,728 A | 1/1967 | Adler | |
| 3,435,342 A | 3/1969 | Burnsweig et al. | |
| 3,501,164 A | 3/1970 | Peterson | |
| 3,631,534 A | 12/1971 | Hirota et al. | |
| 3,663,948 A | 5/1972 | Nagae et al. | |
| 3,771,077 A | 11/1973 | Tischer | |
| 3,829,881 A | 8/1974 | Kohashi | |
| 4,009,444 A | 2/1977 | Farkas et al. | |
| 4,467,269 A * | 8/1984 | Barzen | 323/356 |
| 4,622,558 A | 11/1986 | Corum | |
| 4,749,950 A | 6/1988 | Farkas | |
| 4,751,515 A | 6/1988 | Corum | |
| 5,406,237 A * | 4/1995 | Ravas et al. | 333/218 |
| 5,633,648 A | 5/1997 | Fischer | |
| 5,748,295 A | 5/1998 | Farmer | |
| 5,949,311 A | 9/1999 | Weiss et al. | |
| 6,121,693 A | 9/2000 | Rock | |

(Continued)

FOREIGN PATENT DOCUMENTS

CA 1186049 4/1985

(Continued)

OTHER PUBLICATIONS

Adler, R.B., L.J. Chu, and R.M. Fano, *Electromagnetic Energy Transmission and Radiation*, Wiley, 1960, p. 31-32.

(Continued)

*Primary Examiner*—Albert W Paladini
(74) *Attorney, Agent, or Firm*—Thomas, Kayden, Horstemeyer & Risley, LLP (57) ABSTRACT

In various embodiments, various systems and methods are provided for power storage. In one embodiment, a power storage apparatus is described that comprises a power multiplier having a multiply-connected electrical structure. A parametric reactance is included in the multiply-connected electrical structure that negates at least a portion of a physical resistance of the multiply-connected electrical structure. A parametric excitation source having a parametric excitation output is applied to the parametric reactance.

20 Claims, 3 Drawing Sheets

U.S. PATENT DOCUMENTS

| | | | |
|---|---|---|---|
| 6,459,247 B1* | 10/2002 | Benes | 323/281 |
| 6,522,030 B1 | 2/2003 | Wall et al. | |
| 6,611,181 B2 | 8/2003 | Marketkar et al. | |
| 6,653,821 B2 | 11/2003 | Kern et al. | |
| 6,653,827 B2 | 11/2003 | Gaither et al. | |
| 6,654,216 B2 | 11/2003 | Horvath et al. | |
| 6,788,163 B2 | 9/2004 | Benham et al. | |
| 6,990,327 B2* | 1/2006 | Zheng et al. | 455/307 |
| 7,033,406 B2 | 4/2006 | Weir et al. | |
| 7,050,913 B2 | 5/2006 | Cox | |
| 7,583,143 B2* | 9/2009 | Pan | 330/254 |
| 2002/0149535 A1 | 10/2002 | Toncich | |
| 2006/0190512 A1 | 8/2006 | Corum | |
| 2006/0190513 A1 | 8/2006 | Corum | |
| 2006/0212176 A1 | 9/2006 | Corum | |
| 2008/0185916 A1 | 8/2008 | Corum et al. | |

FOREIGN PATENT DOCUMENTS

| | | |
|---|---|---|
| EP | 0043591 | 1/1982 |
| SE | 152491 | 11/1955 |

OTHER PUBLICATIONS

Collin, R.E., Foundations for Microwave Engineering, McGraw-Hill, 1966, pp. 80-89, 144-197.

Corum, J.F. and K.L. Corum, "RF Coils, Helical Resonators and Voltage Magnification by Coherent Spatial Modes," Microwave Review, Sep. 2001, pp. 36-45.

Corum, J.F., "A Concentric Array for Low and Medium Frequencies," 1990 IEEE Antennas and Propagation Society International Symposium Digest, Dallas, Texas, May 1990, vol. 2, pp. 832-835.

Corum, J.F., "A Novel Structure for Improved Directivity," Proceedings of the 1988 IEEE Antennas and Propagation Society International Symposium, Syracuse, New York, Jun. 1988, pp. 824-827.

Corum, J.F., "Experimental Validation of the Improved Directivity Element—Elevation Plane Control," Proceedings of the 1989 IEEE Antennas and Propagation Society International Symposium, San Jose, California, 1989, pp. 702-705.

Corum, J.F., "Toroidal Helix Antenna," Proceedings of the 1987 IEEE Antennas and Propagation Society International Symposium, Blacksburg, Va., Jun. 1987, pp. 832-835).

Corum, J.F., "Vehicular Wide-Band Antenna System," Tactical Warfare Simulation and Technology Information Analysis Center, Battelle Memorial Institute, Final Report, US Army Missile Command Contract No. DAAH01-91-D-R006, Jun. 30, 1993, pp. 1-41.

Corum, J.F., B.F. Pinzone, and K.L. Corum, "A New Low Profile AntiSkywave Antenna for AM Broadcasting," Proceedings of the 1988 National Association of Broadcasters (NAB) 42nd Engineering Conference, Las Vegas, Nevada, Apr. 1988, pp. 7-15.

Corum, J.F., B.F. Pinzone, and K.L. Corum, "Antiskywave Antenna Design," Radio World, May 15, 1988, pp. 45-46.

Corum, K.L. and J.F. Corum, "Tesla and the Magnifying Transmitter," Proceedings of the 1992 International Tesla Symposium, International Tesla Society, 1992, pp. 55-78.

IEEE Standard Dictionary of Electrical and Electronics Terms, McGraw-Hill, second edition, 1977, p. 391.

Johnson, W.C., Transmission Lines and Networks, McGraw-Hill, 1950, pp. 117-120.

Nourai, A. "Comparison of the Costs of Energy Storage Technologies for T&D Applications", American Electric Power, downloaded from www.electricitystorage.org, Jul. 2004, pp. 1-30.

Paris, D.T. and F.K. Hurd, Basic Electromagnetic Theory, McGraw-Hill, 1969, pp. 512-527.

Terman, F.E., Radio Engineering Handbook, McGraw-Hill, 1943, pp. 172-178, 191-215.

Statement Submitted under 37 CFR §1.56 (8 pages) with Attached Declaration of Dr. James F. Corum (4 pages), Dec. 2009.

Alexanderson, E.F.W., "A Magnetic Amplifier for Radio Telephony," Proceedings of the IRE, vol. 4, Apr. 1916, pp. 101-120.

Balakin, A. B., "A new approach to the detection of gravitational waves," American Institute of Physics, pp. 183-184, Feb. 1991.

Barrow, W.L., "Frequency Modulation and the Effects of a Periodic Capacity Variation in a Nondissipative Oscillatory Circuit," Proc. IRE, vol. 21, 1933, pp. 1182-1202.

Barrow, W.L., "On the Oscillations of a Circuit Having a Periodically Varying Capacitance," Proc. IRE, vol. 22, 1934, pp. 201-212.

Barrow, W.L., D.B. Smith and F.W. Baumann, "A Further Study of Oscillatory Circuits Having Periodically Varying Parameters—Part I," Jour. Franklin Institute, vol. 221, 1936, pp. 403-416.

Barrow, W.L., D.B. Smith and F.W. Baumann, "A Further Study of Oscillatory Circuits Having Periodically Varying Parameters—Part II," Jour. Franklin Institute, vol. 221, 1936, pp. 509-529.

Beckman, P., "Einstein Plus Two," The Golem Press, CO, Chapter 1.12, "Radiation and Some Other Matters", pp. 156-162, 1987.

Benahmend, N. et al., "Finite Element Analysis of RF Couplers with Sliced Coaxial Cable," Microwave Journal, pp. 106, 113-114, 116, 118, 120, Nov. 2000.

Bennett, W.R., "A General Review of Linear Varying Parameter and Nonlinear Circuit Analysis," Proc. IRE, vol. 38, 1950, pp. 259-263.

Bennett, W.R., "Amplification in Nonlinear Reactive Networks," IRE Transactions on Circuit Theory, vol. CT-7, Dec. 1960, pp. 440-446.

Blair, D.G., et al, "High Sensitivity Gravitational Wave Antenna with Parametric Transducer Readout," Phys. Rev. Letters, vol. 74, Mar. 13, 1995, pp. 1908-1911.

Bloom, S. and K.K.N. Chang, "Parametric Amplification Using Low-Frequency Pumping," Journal of Applied Physics, vol. 29, 1958, p. 594.

Bloom, S., and K.K.N. Chang, "Theory of Parametric Amplification Using Nonlinear Reactances," RCA Review, vol. 18, Dec. 1957, pp. 578-593.

Carlson, A.B., Communication Systems, McGraw-Hill, second edition, 1975, p. 187-188.

Chiang, Yi-Chyun, et al., "Design of a Wide-Band Lumped-Element 3-dB Quadrature Coupler," IEEE Transactions on Microwave Theory and Techniques, pp. 476-479, Mar. 2001.

Corum, J.F., "The Electromagnetic Stress-Tensor as a Possible Space Drive Propulsion Concept," 37th AIAA/ASME/SAE/ASEE JPC Conference and Exhibit, Salt Lake City, Utah, Jul. 2001, pp. 1-11.

Cullen, A.L., "A Traveling Wave Parametric Amplifier," Nature, vol. 181, Feb. 1, 1958, p. 332.

Cunningham, W.J., Nonlinear Systems, McGraw-Hill, 1958, pp. 259-280.

Faraday, M., "On a Peculiar Class of Acoustical Figures; and on Certain Forms Assumed by a Group of Particles upon Vibrating Elastic Surfaces," Philosophical Transactions of the Royal Society, London, vol. 121, May 1831, pp. 299-340.

Franke, E., "Capacitively Coupled Hybrids," Ham Radio, pp. 70-78, Mar. 1983.

Gorelik, G., Resonance Phenomena in Linear Systems With Periodic Parameters, Technical Physics of the USSR, Leningrad, 1935, vol. 2, No. 2-3, pp. 135-180.

Hartley R.V.L., "Oscillations with Non-linear Reactances," Bell System Technical Journal, vol. 15, No. 3, Jul. 1936, pp. 424-440.

Hayes, P.S. and R.A. Surette, "Methods of Producing High Levels of RF Power for Test Purposes," Proceedings of the 1988 National Association of Broadcasters (NAB) 42nd Engineering Conference, Las Vegas, Nevada, Apr. 1988, pp. 380-386.

Hussey, L.W. and Wrathall, L.R., "Oscillations in an Electromechanical System," Bell System Technical Journal, vol. 15, No. 3, Jul. 1936, pp. 441-445.

Karasev, M.D., "Some General Properties of Nonlinear Reactive Elements," Soviet Physics Uspekhi, vol. 67 (2), No. 5, Oct. 1959, pp. 719-748.

Kharkevich, A.A., Nonlinear and Parametric Phenomena in Radio Engineering, translated by J.G. Adashko, John F. Rider Publishers, 1962, pp. 166-176.

Kuecken J. A, "Antennas and Transmission Lines," Howard W. Sams & Co., New York, Chapter 23, pp. 149-159, 1969.

Landon, V.D., "The Use of Ferrite-Cored Coils as Converters, Amplifiers, and Oscillators," RCA Review, vol. 10, 1949, pp. 387-396.

Lazarev, V.A., "On Hetero-Parametric Excitation," Zhurnal Teknicheskoi Fiziki, vol. 3, 1934, pp. 30-48 (Translation by Peter J. Pesavento available on the internet at http://nedyn.com/translations.html ].

Lombardo, P.P., and E.W. Sard, "Low Frequency Prototype Traveling-Wave Reactance Amplifier," Proceedings of the IRE, vol. 47, 1959, pp. 990-1005.

Lord Rayleigh (J.W. Strutt), "On the Crispations of Fluid Resting upon a Vibrating Support," Phil. Mag., vol. 16, 1883, pp. 50-58.

Lord Rayleigh, (J.W. Strutt), "On the Maintenance of Vibrations by Forces of Double Frequency, and on the Propagation of Waves Through a Medium with a Periodic Structure," Phil. Mag., vol. 24, #147, Aug. 1887, pp. 145-159.

Lord Rayleigh, (J.W. Strutt), Theory of Sound, Macmillan, 2nd edition, 1894, vol. 1, pp. 76-85.

Louisell, W.H., Coupled Mode and Parametric Electronics, Wiley, 1960, p. 92-147.

Mandelstam, L., N. Papalexi, A. Andronov, S. Chaikin and A. Witt, "Report on Recent Research on Nonlinear Oscillations," Technical Physics of the USSR, Leningrad, vol. 2 No. 2-3, 1935, pp. 81-135. (Translation by Philip V. Pesavento available on the internet at http://nedyn.com/Mandelstam.html).

Mandelstam, L.I. and and N. Papalexi, "Oscillations in an Electrical System Energized by Means of Periodically Varying Capacitances," Zhurnal Teknicheskoy Fiziki, vol. 3, No. 7, 1933, pp. 1-6. (Translation by Peter J. Pesavento, available on the internet at: http://nedyn.com/translations.html].

Mandelstam, L.I. and N. Papalexi, "On the Parametric Excitation of Electric Oscillations," Zhurnal Teknicheskoy Fiziki, vol. 4, No. 1, 1934, pp. 1-47. [Translation UCRL-Trans-10231, Univ. of Calif., Lawrence Radiation Laboratory, Livermore, CA, Feb. 1968. Recent copy available at: http://nedyn.com/translations.html].

Manley, J.M. and E. Peterson, "Negative Resistance Effects in Saturable Reactor Circuits," AIEE Transactions, vol. 65, Dec. 1946, pp. 870-881.

Manley, J.M. and H.E. Rowe, "Some General Properties of Nonlinear Elements—Part I. General Energy Relations," Proceedings of the IRE, vol. 44, 1956, pp. 904-913.

Manley, J.M., "Some General Properties of Magnetic Amplifiers," Proceedings of the IRE, vol. 39, Mar. 1951, pp. 242-251.

Manley, J.M., "Some Properties of Time Varying Networks," IRE International Convention Record, vol. 8, Pt. 2, 1961, pp. 69-78.

Matthaei, G.L., L. Young, and E.M.T. Jones, Microwave Filters, Impedance Matching Networks, and Coupling Structures, McGraw-Hill, 1964, Chapter 14. See pp. 843-887.

McWhorter, M., "Broadband RF Transformer Directional Couplers," RF Design, pp. 53-58, Jul. 1991.

Meers, B. J., "Recycling in laser-interferometric gravitational-wave detectors," The American Physical Society, vol. 38, No. 8, pp. 2317-2326, Oct. 1988.

Melde, F., "Über die Erregung Stehender Wellen eines fadenförmigen Körpers," Ann. Physik Chemie, vol. 109, 1860, p. 193-254, and vol. 111, 1860, p. 513-537.

Miller, S.J., "The Traveling Wave Resonator and High Power Microwave Testing," Microwave Journal, Sep. 1960, pp. 50-58.

Milosevic, L. J., et al., "Traveling-Wave Resonators," IRE Transactions on Microwave Theory and Techniques, pp. 136-143, Apr. 1958.

Minorsky, N., "On Parametric Excitation," Journal of the Franklin Institute, vol. 240, 1945, pp. 25-46.

Minorsky, N., Nonlinear Oscillations, Van Nostrand, 1962, pp. 464-469, 488-509.

Minorsky, N., "Parametric Excitation," Journal of Applied Physics, vol. 22, No. 1, California, Jan. 1951, pp. 49-54.

Mumford, W.W., "Some Notes on the History of Parametric Transducers," Proceedings of the IRE, vol. 48, Issue 5, May 1960, pp. 848-853.

Nergaard, L.S., "Nonlinear Capacitance Amplifiers," RCA Review, vol. 20, 1959, pp. 3-17.

Oliver, B. M., "Directional Electromagnetic Couplers," Proceedings of the I-R-E, pp. 1686-1692, Nov. 1954.

Page, C.H., "Frequency Conversion with Nonlinear Reactance," Journal of Research of the National Bureau of Standads, vol. 58, May 1957, pp. 227-236.

Peterson, E., "Atomic Physics and Circuit Theory," Bell Laboratories Record, vol. 7, No. 2, Feb. 1929, pp. 231-233.

Raab, F. J., "Recycling for a cleaner signal," Nature, vol. 351, pp. 98-100, May 1991.

Raskin, J.P., A.R. Brown, B.T. Khuri-Yakub, and G.M. Rebeiz, "A Novel Parametric-Effect MEMS Amplifier," IEEE Jour. of Microelectromechanical Systems, vol. 9, Dec. 2000, pp. 528-537.

Roe, G.M., and M.R. Boyd, "Parametric Energy Conversion in Distributed Systems," Proc. IRE, vol. 47, 1959, pp. 1213-1218.

Rowe, H.E., "Some General Properties of Nonlinear Elements—Part II. Small Signal Theory," Proceedings of the IRE, vol. 46, 1958, pp. 850-860.

Schwarzkopf, D.B., "The Traveling Wave Resonator as a Short Pulse Generator," Microwave Journal, Oct. 1962, pp. 172-180.

Sferrazza, P.J., "A Traveling Wave Resonator," Proceedings of the National Electronics Conference, vol. 2, 1955, pp. 968-973.

Somlo, P.I., "Some Aspects of the Measurement of the Q Factor of Transmission Lines," IEEE Transactions on Microwave Theory and Techniques, pp. 472-478, Nov. 1963.

Strain, K. A., et al., "Experimental Demonstration of Dual Recycling for Interferometric Gravitational-Wave Detectors," Physical Review Letters, The American Physical Society, vol. 66, No. 11, pp. 1391-1394, Mar. 1991.

Suhl, H., "A Proposal for a Ferromagnetic Amplifier in the Microwave Range," Physical Review, vol. 106, Apr. 15, 1957, pp. 384-385.

Suhl, H., "Theory of the Ferromagnetic Amplifier," Journal of Applied Physics, vol. 28, Nov. 1957, pp. 1225-1236.

Tez, E.S., and Smith, I.R., "The Parametric Transformer: A Power Conversion Device Demonstrating the Principles of Parametric Excitation," IEEE Transactions on Education, vol. E-27, No. 2, May 1984, Loughborough, England, pp. 56-65.

Tien, P.K., "Parametric Amplification and Frequency Mixing in Propagating Circuits," Journal of Applied Physics, vol. 29, 1958, pp. 1347-1357.

Tien, P.K., and H. Suhl, "A Traveling Wave Ferromagnetic Amplifier," Proc. IRE, vol. 46, 1958, pp. 700-706.

Tischer, F.J., "Resonance Properties of Ring Circuits," IEEE Transactions on Microwave Theory and Techniques, vol. MTT-5, 1957, pp. 51-56.

Tomiyasu, K., "Attenuation in a Resonant Ring Circuit," IEEE Transactions on Microwave Theory and Techniques, vol. MTT-8, 1960, pp. 253-254.

Tomiyasu, K., "Effect of a Mismatching Ring in a Traveling-Wave Resonant Circuit," G. E. Microwave Lab, p. 267, Sep. 1957.

Valdes, L.B., Circuit Conditions for Parametric Amplification, General Electric Microwave Laboratory, Palo Alto, California, May 1958, pp. 129-141.

Van der Zeil, A., "On the mixing Properties of Nonlinear Condensers," Journal of Applied Physics, vol. 19, 1948, pp. 999-1006.

Vinet J. Y., et al., "Optimization of Long-Baseline Optical Interferometers for Gravitational-wave Detection," The American Physical Society, vol. 38, No. 2, pp. 433-447, Jul. 1988.

Weiss, M.T., "A Solid State Microwave Amplifier and Oscillator Using Ferrites," Physical Review, vol. 107, Jul. 1957, p. 317.

Weiss, M.T., "Quantum Derrivation of Energy Relations Analogous to those for Nonlinear Reactances," Proceedings of the IRE, vol. 45, Jul. 1957, pp. 1012-1025.

Winter-Gunther, H., "Self-Excitation of Systems with Periodically Varying Inductances," Jahrbuch der drahtlosen Telegraphie und Telephonie, vol. 37, No. 2, 1931, pp. 172-174 (pp. 1-6 as translated).

Winter-Gunther, H., "On Self-Excited Oscillations in Circuits with Iron-Core Coils," Jahrbuch der drahtlosen Telegraphie und Telephonie, vol. 34, No. 2, 1929, pp. 41-49 (pp. 1-18 as translated).

Young, L., "A Hybrid-Ring Method of Simulating Higher Powers than are Available in WaveGuides," Radio Section, Paper No. 1643, 1954.

International Search Report and Written Opinion for International Application No. PCT/US06/04324 mailed on Jun. 22, 2007.

International Search Report and Written Opinion for International Application No. PCT/US06/04522 mailed on Jun. 31, 2007.

International Search Report and Written Opinion for International Application No. PCT/US08/52387 mailed on Jul. 14, 2008.

International Search Report and Written Opinion for International Application No. PCT/US08/59414 mailed on Aug. 15, 2008.

* cited by examiner

ELECTRIC POWER STORAGE

CROSS-REFERENCE TO RELATED APPLICATION

This application is a continuation-in-part of co-pending U.S. Utility patent application Ser. No. 11/670,620 entitled, "PARAMETRIC POWER MULTIPLICATION," filed on Feb. 2, 2007, which is incorporated herein by reference in its entirety.

BACKGROUND

Power multiplication may be desirable for many applications that require significant power resources that cannot be economically or physically provided given the current state of power technology. For example, some have attempted to use conventional mechanical flywheel and capacitive storage arrangements for energy storage and power multiplication. However, such approaches are often inadequate due to the decay in amplitude and/or frequency of power output as stored energy is extracted or released.

Power multiplication may also be achieved electrically using an electromagnetic path configuration for accumulating electrical energy and stepping up or magnifying real AC power. Such technology has been taught by Tischer, F. J., *Resonance Properties of Ring Circuits*, IEEE Transactions on Microwave Theory and Techniques, Vol. MTT-5, 1957, pp. 51-56. The power multiplier suggested by Tischer makes it possible to obtain practical power multiplication of 10 to 500 times the output power level of a given generator. The power multiplication is obtained without appreciable decay in either amplitude or frequency.

However, the power multiplier suggested by Tischer operates at relatively short wavelengths where the physical circumference of the device is on the order of an integral number of free space wavelengths given that the electrical length of the electromagnetic path suggested by Tischer equals an integer multiple of the wavelength of a traveling wave multiplied therein. At such short wavelengths, the physical size of the electromagnetic path is such that it can be practically constructed. However, power multiplication using an approach suggested by Tischer is not practical at lower power frequencies such as 60 Hertz with relatively long wavelengths as the size of the electromagnetic path would be on the order of several hundred miles. In addition, the maximum power that can be stored in the power multiplier suggested by Tischer is limited by the resistance of the waveguide.

In current electrical distribution systems such as the North American power grid it is often the case that Utilities experience severe mismatches between peak and average load demands. This can result in brown outs and blackouts in the system. Also, the North American power grid is being stretched to capacity. Consequently, it can be the case that brown outs and black outs may start chain reactions in the power grid that results in loss of reliable power.

In addition, another problem that energy markets face is that intervening load points such as cities often separate power generation stations from remote electrical loads. During heavy load times, the demand throughput cannot be conveyed from the power generation stations to the remote loads around the intermediate cities.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The various embodiments of the present invention include the use of power multipliers as described in U.S. patent application Ser. No. 11/670,620 filed on Feb. 2, 2007, which is incorporated herein by reference in its entirety. The power multipliers as described herein may be constructed from lumped elements or distributed elements as set forth in the above described U.S. patent application. For purposes of the discussion herein, one embodiment of a power multiplier is described herein that is constructed from lumped elements. However, it is understood that in other embodiments of the present invention, power multipliers may be employed that are constructed of distributed elements, or a combination of both lumped and distributed elements.

Figure 1:
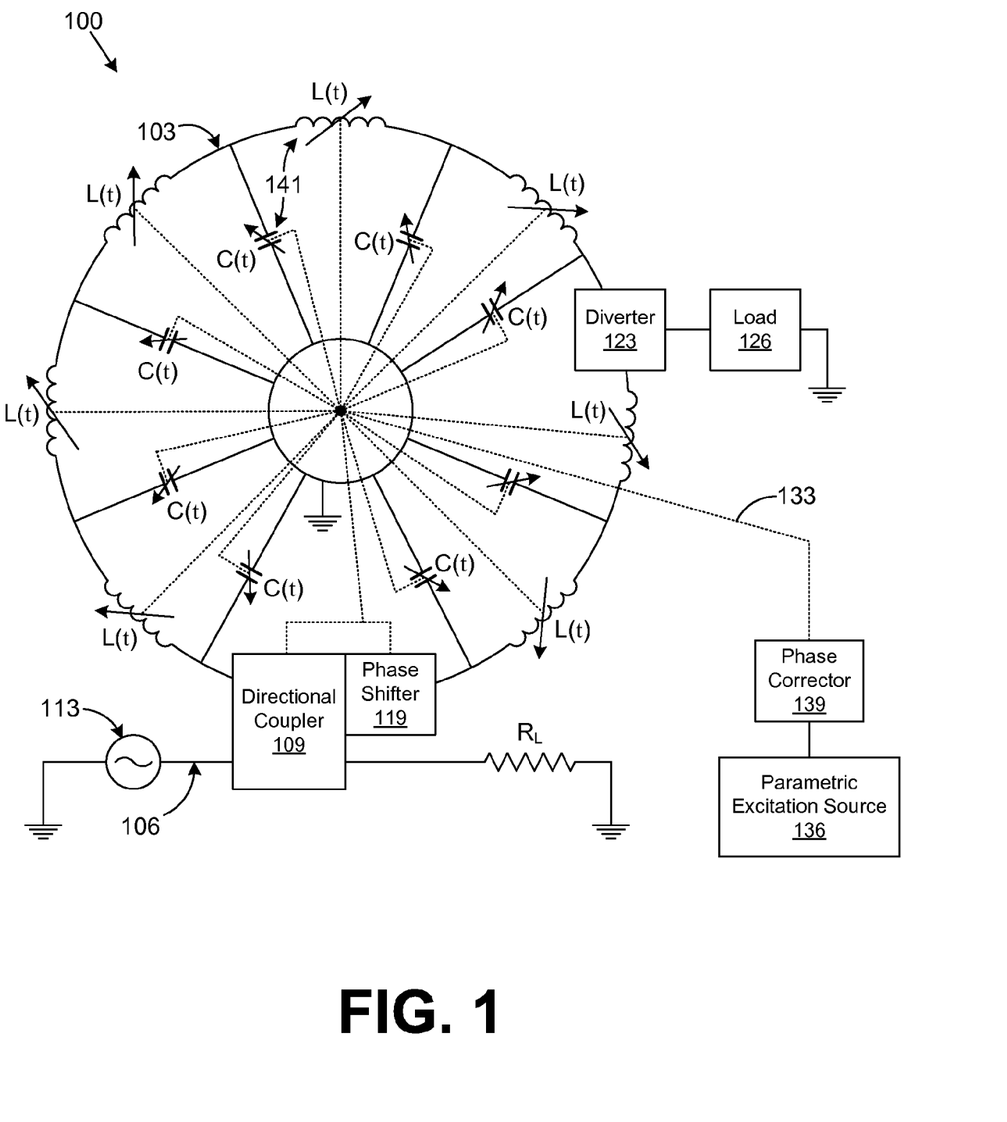
FIG. 1 is a schematic diagram of a power multiplier that employs parametric excitation to store electrical energy according to an embodiment of the present invention.

Turning then, to FIG. 1, shown is an example of a power multiplier 100 according to an embodiment of the present invention. The power multiplier 100 includes a power multiplying network 103 and a launching network 106. The launching network 106 is coupled to the power multiplying network 103 via a directional coupler 109 that couples the launching network 106 to the power multiplying network 103. A power source 113 is coupled to the launching network 106. Also, the launching network 106 is terminated in a matching load $R_L$.

According to one embodiment, the power multiplying network 103 is a multiply-connected, velocity inhibiting circuit constructed from a number of lumped-elements. As contemplated herein, the term "network" refers to an interconnected structure of electrical elements. The terms "multiply-connected" are mathematical terms relating to the existence of a closed path in a resonator, waveguide, or other electrical structure that cannot be reduced to a point without part of the closed path passing through regions that are external to the geometrical boundaries of the resonator, waveguide, or other electrical pathway. The power multiplying network 103 is "velocity inhibiting" as the electrical structure of the power multiplying network 103 results in a reduced velocity of propagation of an electromagnetic wave through the power multiplying network 103 relative to the speed of an electromagnetic wave through free space, which is the speed of light.

In addition, the term "lumped" refers to elements that are effectively concentrated at a single location. Thus, the terms "lumped-elements" refer to discrete, two-terminal, concentrated electrical elements such as capacitance, inductances, resistance, and/or conductance. Thus, the lumped-elements as described herein may comprise discrete inductors, capacitors, or resistors. In addition, as contemplated herein, lumped-elements may also comprise diodes, transistors, and other semi-conductors that may be described, for example, as nonlinear resistors or conductors that have resistance or conductance that is controlled by the polarity of applied voltages or currents, etc. In addition, lumped-elements may also comprise inherent capacitances, inductances, resistances, or conductances of various electrical structures such as helices, parallel plates, or other structure as will be discussed. Similar to the power multiplying network 103, the directional coupler 109 may also be constructed using lumped-elements. Thus, the power multiplying network 103 provides one example of a multiply-connected circuit that may comprise, for example, a circuit formed in a ring. Alternatively, according to other embodiments, a power multiplier may be constructed out of distributed element components formed in a multiply-connected electrical structure such as a ring. For example, an alternative multiply-connected electrical structure may comprise a loop of coaxial cable or other similar structure.

According to one embodiment, the power multiplying network 103 is a velocity inhibiting circuit that results in a slower velocity of propagation of an electrical disturbance such as a traveling wave. In this respect, the power multiplying network 103 has an electrical length that is equal to an integer multiple of the wavelength of the operating frequency of the power source 113. Due to the velocity inhibited nature of the power multiplying network 103, its size is quite compact in comparison with the wavelength of the operating frequency of the power source 113. In addition, the directional coupler 109 causes a phase shift that is equal to one quarter of the wavelength of an exciting traveling wave generated by the power source 113 at the operating frequency as will be discussed.

The power multiplier 100 also includes a phase shifter 119 as shown. The phase shifter 119 comprises, for example, a circuit constructed from lumped-elements that is combined in series with a portion of the directional coupler 109 to make up an inductance L(t) of the specific section within which the directional coupler 109 is located.

In one embodiment, the power multiplying network 103 is constructed from lumped-elements such as, for example, parametric reactances that include variable inductances L(t) and variable capacitances C(t). Common examples of time-varying or parametric reactances are inductors and capacitors whose permittivity and permeability functions are pumped in time by a control voltage or current. Similarly, distributed time-varying impedances have their constitutive parameters pumped by a control signal, which may be electrical, electromagnetic, optical, thermal, mechanical, acoustical, etc. For a more detailed discussion of the parametric reactances comprising the variable inductances L(t) and variable capacitances C(t), reference is made to the discussion in the co-pending U.S. patent application Ser. No. 11/670,620 entitled, "PARAMETRIC POWER MULTIPLICATION," filed on Feb. 2, 2007 and incorporated by reference above.

The power multiplier 100 also includes a diverter 123 that is coupled to a load 426. The diverter 123 is configured to diverts power from the power multiplying network 103 to a load 126 in a controlled manner. Specifically, all of the power may be diverted out of the power multiplying network 103 in a relatively short pulse that may last, for example, on the order of microseconds. Alternatively, the diverter 123 may be configured to divert a portion of the power stored in the power multiplying network 103. Stated another way, the power diverted to the load 126 may be less than a total power stored in the power multiplying network 103. To this end, it may be possible to supply power to the load 126 for a significant period of time. Such a time period would depend upon the amount of power stored in the power multiplying network 103 or ring as well as the magnitude of the power diverted to the load 126 and is application specific.

According to the various embodiments, one or more of the parametric reactances in the power multiplying network 103 are varied in time at a frequency that is in a predefined relationship relative to the operating frequency of the power source 113. That is to say, the frequency of at which the parametric reactances are varied in time is in a predefined relationship relative to the frequency of a traveling wave in the ring formed by the power multiplying network 103. For a more specific discussion as to the relationship between the frequency of the power source 113 and the frequency at which the parametric reactances are varied, reference is made once again to U.S. patent application Ser. No. 11/670,620 entitled, "PARAMETRIC POWER MULTIPLICATION," filed on Feb. 2, 2007 and incorporated by reference above.

According to one embodiment, the parametric reactances L(t) and C(t) are varied based upon a parametric excitation output or signal 133. The parametric excitation signal/output may be generated in any one of a number of ways. In one embodiment, the parametric excitation output 133 is generated by a parametric excitation source 136. In one embodiment, the parametric excitation output 133 generated by the parametric excitation source 136 is applied to a phase corrector 139. The phase corrector 139 provides for the adjustment of the phase of the parametric excitation output 133 so as to align properly with the traveling wave in the power multiplying network 103, thereby resulting in parametric gain as was described in U.S. patent application Ser. No. 11/670,620 entitled, "PARAMETRIC POWER MULTIPLICATION," filed on Feb. 2, 2007 and incorporated by reference above. The parametric excitation source 136 may comprise anyone of a plurality of different types of sources as will be described.

Figure 2A:
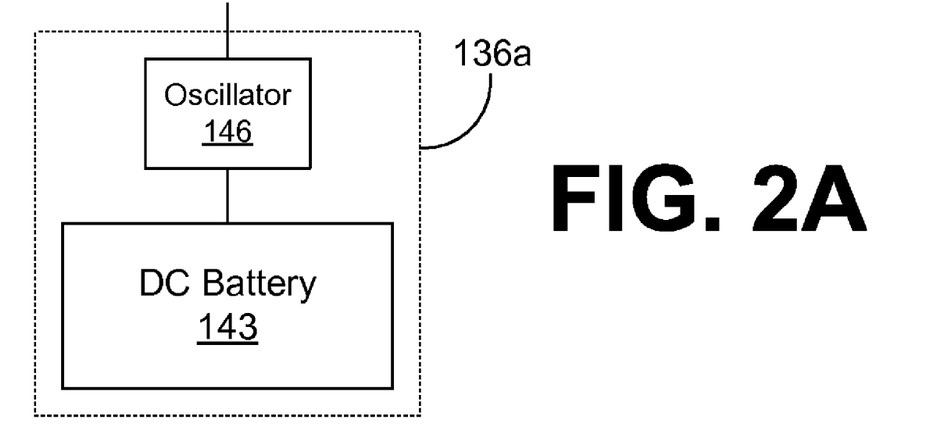
FIGS. 2A-2C are block diagrams of various examples of sources of a parametric excitation output that is applied to a parametric reactance in the power multiplier of FIG. 1 according to various embodiments of the present invention.

Referring next to FIG. 2A, shown is one example of a parametric excitation source 136a according to an embodiment of the present invention. The parametric excitation source 136a comprises a DC battery that generates a DC output that is coupled to an oscillator 146. The oscillator 146 converts the DC voltage to an AC voltage. The frequency of oscillation of the AC voltage generated by the oscillator 146 is specified so as to result in parametric excitation of the multiply-connected electrical structure as described above. In addition, for the parametric excitation source 136a, the oscillator 146 may actually act in place of the phase corrector 139 to the extent that the phase of the output of the oscillator 146 can be adjusted.

Figure 2B:
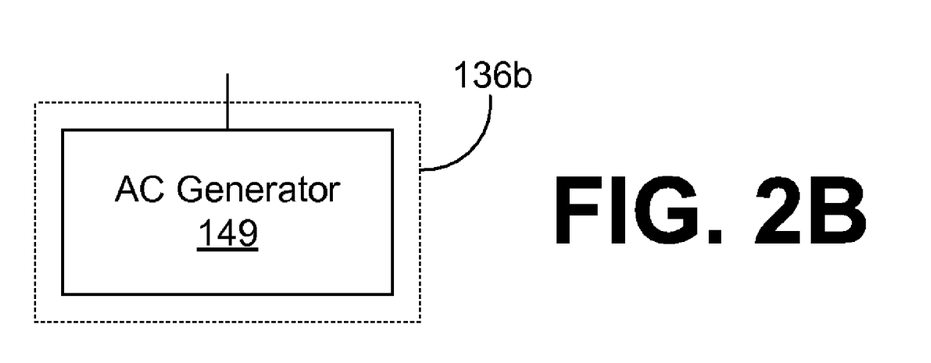

Referring next to FIG. 2B, shown is another example of a parametric excitation source 136b according to an embodiment of the present invention. The parametric excitation source 136b comprises an AC generator 149. The AC generator 149 may be configured to generate the parametric excitation signal at the required frequency for parametric excitation of the multiply-connected electrical structure as described above. Alternatively, the output of the AC generator 149 may be applied to a frequency converter as can be appreciated so as to result in the proper frequency applied to the parametric reactances of the power multiplier 100 for parametric excitation of the multiply-connected electrical structure.

Figure 2C:
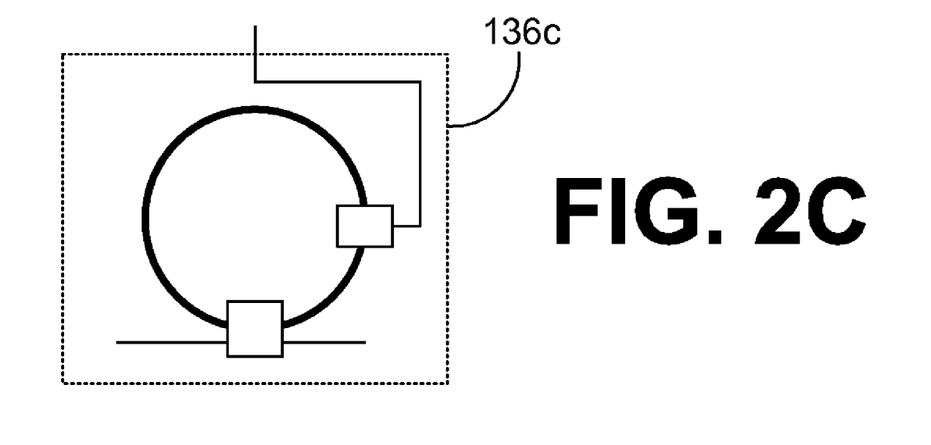

Still further, with reference to FIG. 2c, shown is another example of a parametric excitation source 136c according to an embodiment of the present invention. The parametric excitation source 136c includes a power multiplier 153 that operates at the appropriate frequency necessary for parametric excitation of the multiply-connected electrical structure according to an embodiment of the present invention.

The use of various parametric excitation sources 136a, 136b, 136c, or other parametric excitation sources facilitates the storage of large amounts of electrical energy in the multiply-connected electrical structure of the power multiplier 100 that can be diverted at relatively large power levels even though the parametric excitation source 136 may actually have a power rating that is much smaller in magnitude than the diverted output. Stated another way, the electrical energy that may be stored in the multiply-connected electrical structure can be much greater than the amount of electrical energy that can be supplied by the parametric excitation sources 136.

With reference back to FIG. 1, the power multiplier 100 may be employed as an AC storage device. In this sense, the power multiplier 100 configured as described above may act as an electrical flywheel or perhaps an AC battery. In this sense, the parametric excitation source 136 generates the parametric excitation output 133 that is applied to the various parametric reactances 141 in the multiply-connected electrical structure such as the power multiplying network 103. The parametric reactances 141 are driven by the parametric excitation output 133 at the appropriate frequency such as, for example, twice the frequency of the power source 113 that supplies power to the multiply-connected electrical structure. Alternatively, other frequencies may be employed.

As a result, a negative resistance is created in the multiply-connected electrical structure that negates at least a portion of a physical resistance of the multiply-connected electrical structure. For a more detailed discussion of the frequency of the parametric excitation output 133 and the creation of a negative resistance in the multiply-connected electrical structure, references is made once again to U.S. patent application Ser. No. 11/670,620 entitled, "PARAMETRIC POWER MULTIPLICATION," filed on Feb. 2, 2007 and incorporated by reference above.

If the magnitude of the parametric excitation output 133 is great enough, then substantially the entire physical resistance of the multiply-connected electrical structure may be negated such that the multiply-connected electrical structure either approaches superconductivity or becomes superconductive. Thus, by applying the parametric excitation output 133 to the parametric reactances in the multiply-connected electrical structure, the physical resistance of the multiply connected electrical structure is reduced or eliminated. This reduces or eliminates the loss of electrical energy traveling through the multiply-connected electrical structure due to the physical resistance of the multiply-connected electrical structure. As a result, it may be possible to store massive amounts of electrical energy in the multiply-connected electrical structure with little loss. Once the magnitude of the parametric excitation output 133 is specified so as to substantially eliminate the effective resistance within the multiply-connected electrical structure, then the resulting superconductivity or near superconductivity allows for the buildup of massive amounts of electrical energy in the multiply-connected electrical structure that can be released over a relatively long period of time or within a short pulse depending upon the specific application.

Given that the resistance of the multiply-connected electrical structure can be reduced to zero or near zero, then it would be possible to build up massive amounts of electrical energy in the multiply-connected electrical structure. Once the electrical energy is built up to the desired level, it can then be maintained in the structure with little or no loss over long periods of time simply by applying an appropriate parametric excitation output 133 to the respective parametric reactances of the multiply-connected electrical structure. The amount of electrical energy that may be stored within a given multiply-connected electrical structure may depend upon the physical limits of the structure in that, as voltages increase, the possibility of arcing and other phenomena increase as well. Thus, the physical limitations of the structure may dictate the ultimate maximum energy storage capacity of a given multiply-connected electrical structure. As such, the ultimate capacity of the multiply-connected electrical structure is design specific.

Given the fact that a massive amount of energy may be stored in a multiply-connected electrical structure and maintained by the proper application of a parametric excitation output 133 to the respective parametric reactances in the multiply-connected electrical structure, the power multipliers provide significant possibilities for energy storage for use upon loss of a primary power source. In one embodiment, the parametric excitation source 136 may be isolated from a power source such as power source 113 (FIG. 1) that generates the electrical power that is applied to the multiply-connected electrical structure through the directional coupler 109. By virtue of the fact that the parametric excitation source 136 is isolated from the power source 113, the amount of energy built up or stored in multiply-connected electrical structure can be maintained upon a failure of the power source 113. Thus, according to various embodiments of the present invention, the power multiplier may include parametric excitation sources 136 that are isolated from the power source 113 so that power may be built up into the multiply-connected electrical structures and stored until needed.

Figure 3:
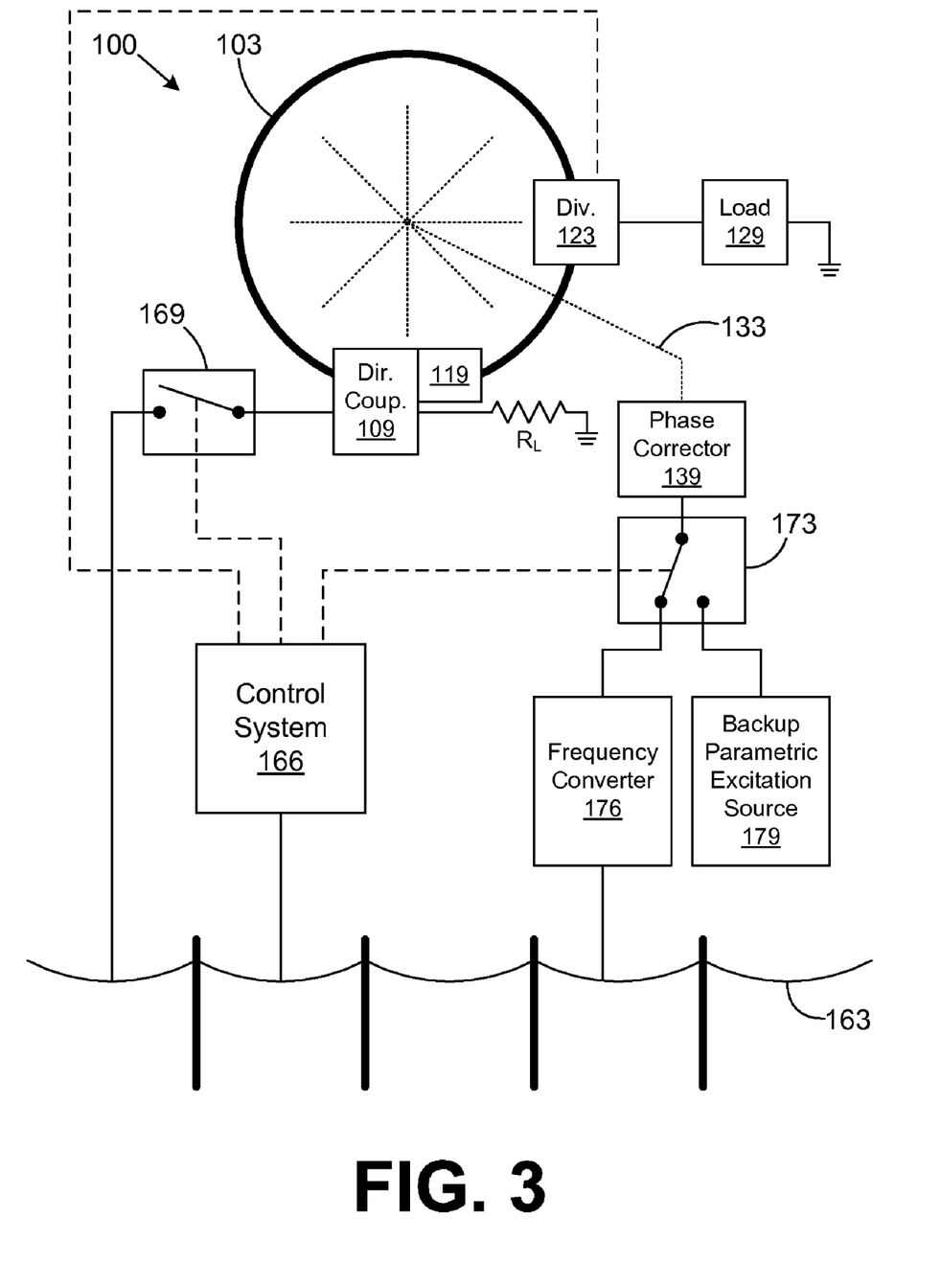
FIG. 3 is a schematic diagram of a power multiplier that employs parametric excitation to store electrical energy obtained from a power grid according to an embodiment of the present invention.

With reference to FIG. 3, shown is a schematic of a power multiplier 100 employed as a power storage device according to an embodiment of the present invention. A power multiplier 100 includes the power multiplying network 103 with a directional coupler 109, the diverter 123, and the load 126. As described above, the power multiplying network 103 is a multiply-connected electrical structure. The directional coupler 109 is also coupled to the termination resistance $R_L$. However, the power source 113 is not shown, where such power source 113 is coupled to a distribution grid 163. The distribution grid 163 may comprise, for example, the 60 hz North American power grid or other power grid. In addition, a control system 166 is coupled to the grid 163. In one embodiment, the control system 166 is configured to detect whether the power source 113 driving the grid 163 has failed resulting, for example, in a brown out or black out. Also, the control system 166 includes control outputs to the diverter 123, a first switching element 169, and a second switching element 173.

The first switching element 169 is employed to direct electrical power from the grid 163 to the directional coupler 109 so as to build up electrical energy in the multiply-connected electrical structure such as the power multiplying network 103. In this manner, the control system 166 is employed to control whether power is to be stored in the multiply-connected electrical structure of the power multiplier 100. According to one embodiment, the control system 166 may be configured or manipulated to apply power from the grid to the multiply-connected electrical structure of the power multiplier 100 at times of low demand on the grid 163 when the costs of electrical energy are low.

FIG. 3 further depicts a frequency converter 176 and a backup parametric excitation source 179 that both include power outputs coupled to the second switching element 173. The frequency converter 173 includes a power input coupled to the grid 163 to receive power from the grid 163. The frequency converter 176 is employed to convert the frequency a power signal received from the grid 163 into the frequency of the parametric excitation output 133. Also, the frequency converter 176 may be configured to control the magnitude of the voltage of the parametric excitation output 133 so as to effectively negate the resistance of the multiply-connected electrical structure. The frequency converter 173 is present in this scenario since the frequency of the parametric excitation output 133 should be at least twice the frequency of the power from the grid 163 that is applied to the multiply-connected electrical structure of the power multiplier 100 as mentioned above.

The second switching element 173 directs the output of the frequency converter 176 to the phase corrector 139. After undergoing phase correction, the parametric excitation output 133 is applied to the parametric reactances of the multiply-connected electrical structure of the power multiplier 100. Upon detection of a loss of power on the grid 163, the control system 166 is configured to cause the switching element 173 to switch to the backup parametric excitation source 179. The backup parametric excitation source 179 may comprise any one of the parametric excitation sources 136 as described with reference to FIGS. 2a-2c, or any other parametric excitation sources that would be suitable for the intended purpose. The switching element 173 may comprise such a device as to minimize or prevent any substantial interruption of the parametric excitation output 133 applied to the parametric reactances of the multiply-connected electrical structure. For example, the switching element 173 may comprise a solid state switch or other component that operates with enough speed so as to switch over the backup parametric excitation source 179 with little interruption in the parametric excitation output 133 applied to the parametric reactances. This is because a momentary drop in the magnitude of the parametric excitation output 133 will create in a momentary "spike" of resistance in the multiply-connected electrical structure that will result in an unwanted loss of energy.

Among the many benefits of the various embodiments of the present invention include the fact that power may be built up into a multiply-connected electrical structure as described above at low load times on the electrical grid. Such low load times may occur, for example, at night time when power rates may be relatively inexpensive. The parametric excitation sources 136 may then be employed to maintain substantially all of the electrical energy in the multiply-connected electrical structures until peak load times when such energy might be needed to supplement existing generation capacity and to provide for power smoothing, etc.

It should be emphasized that the above-described embodiments of the present invention are merely possible examples of implementations, merely set forth for a clear understanding of the principles of the various embodiments of the present invention. Many variations and modifications may be made to the above-described embodiment(s) of the invention without departing substantially from the spirit and principles of the various embodiments of the invention. All such modifications and variations are intended to be included herein protected by the following claims.

Therefore, having thus described the invention, at least the following is claimed:

1. A power storage apparatus, comprising:
  a power multiplier having a multiply-connected electrical structure;
  a parametric reactance that negates at least a portion of a physical resistance of the multiply-connected electrical structure; and
  a parametric excitation source having a parametric excitation output applied to the parametric reactance.

2. The power storage apparatus of claim 1, wherein the parametric excitation output is of a magnitude that substantially negates the physical resistance of the multiply-connected electrical structure.

3. The power storage apparatus of claim 1, wherein the parametric excitation source is isolated from a power source that generates a source output that is applied to the multiply-connected electrical structure through a directional coupler, thereby allowing an amount of energy to be maintained in the multiply-connected electrical structure upon a failure of the power source.

4. The power storage apparatus of claim 1, wherein the parametric excitation source further comprises a DC battery and an oscillator.

5. The power storage apparatus of claim 1, wherein the parametric excitation source further comprises a generator.

6. The power storage apparatus of claim 1, wherein the parametric excitation source further comprises a second power multiplier.

7. The power storage apparatus of claim 1, wherein the parametric excitation source further comprises:
  a frequency converter having a utility input;
  a backup parametric excitation source; and
  a switching mechanism that alternatively applies an output of the frequency converter or an output of the backup parametric excitation source to the parametric reactance.

8. The power storage apparatus of claim 1, further comprising a diverter circuit that diverts power from the multiply-connected electrical structure to a load, wherein the power diverted to the load is less than a total power stored in the multiply-connected electrical structure.

9. A method for storing power comprising the steps of:
  storing an amount of electrical energy in a multiply-connected electrical structure of a power multiplier;
  producing a parametric excitation output; and
  applying the parametric excitation output to at least one parametric reactance in the multiply-connected electrical structure to negate at least a portion of a physical resistance of the multiply-connected electrical structure to reduce a loss of the electrical energy in the multiply-connected electrical structure due to the physical resistance.

10. The method of claim 9, further comprising the step of isolating a source of the parametric excitation output from an input power applied to the multiply-connected electrical structure, wherein the electrical energy is maintained in the multiply-connected electrical structure upon a loss of the input power.

11. The method of claim 9, further comprising the step of negating substantially all of the physical resistance of the multiply-connected electrical structure to minimize the loss of the electrical energy in the multiply-connected electrical structure.

12. The method of claim 9, wherein the step of producing the parametric excitation output further comprises the step of generating the parametric excitation output using a DC battery and an oscillator.

13. The method of claim 9, wherein the step of producing the parametric excitation output further comprises the step of generating the parametric excitation output using a generator.

14. The method of claim 9, wherein the step of producing the parametric excitation output further comprises the step of obtaining the parametric excitation output from power stored in a second power multiplier.

15. The method of claim 9, wherein the step of producing the parametric excitation output further comprises the steps of:
  converting a power input into the parametric excitation output using a frequency converter; and generating the parametric excitation output using a backup parametric excitation source upon a loss of the power input.

16. The method of claim 15, further comprising the step of switching between the power input and the backup parametric excitation source upon a loss of the power input without a substantial interruption of the parametric excitation output applied to the at least one parametric reactance.

17. The method of claim 9, further comprising the step of diverting power stored in the multiply-connected electrical structure to a load, wherein the power diverted to the load is less than a total power stored in the multiply-connected electrical structure.

18. A system for storing power comprising:
 a power multiplier having a multiply-connected electrical structure to store an amount of electrical energy;
 means for producing a parametric excitation output; and
 at least one parametric reactance in the multiply-connected electrical structure, wherein the parametric excitation output is applied to the parametric reactance to negate at least a portion of a physical resistance of the multiply-connected electrical structure to reduce a loss of the electrical energy in the multiply-connected electrical structure due to the physical resistance.

19. The system of claim 18, wherein means for producing the parametric excitation output further comprises a DC battery and an oscillator.

20. The system of claim 18, wherein means for producing the parametric excitation output further comprises a generator.

* * * * *